(12) United States Patent
Lee et al.

(10) Patent No.: US 12,434,537 B2
(45) Date of Patent: Oct. 7, 2025

(54) AIR-CONDITIONING VENT STRUCTURE

(71) Applicants: Hyundai Motor Company, Seoul (KR); Kia Corporation, Seoul (KR)

(72) Inventors: Yoon Hyung Lee, Whasung-Si (KR); Sang Shin Lee, Seongnam-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 446 days.

(21) Appl. No.: 18/078,517

(22) Filed: Dec. 9, 2022

(65) Prior Publication Data

US 2023/0278396 A1    Sep. 7, 2023

(30) Foreign Application Priority Data

Mar. 3, 2022   (KR) .................. 10-2022-0027344

(51) Int. Cl.
    *B60H 1/00*       (2006.01)
(52) U.S. Cl.
    CPC .............. *B60H 1/00835* (2013.01)
(58) Field of Classification Search
    USPC .................................. 454/69–165
    See application file for complete search history.

(56) References Cited

U.S. PATENT DOCUMENTS

| 6,048,263 A   | * | 4/2000 | Uchida ............. B60H 1/00842 165/204 |
| 2014/0179213 A1 | * | 6/2014 | Moon ..................... B60H 1/34 454/152 |

FOREIGN PATENT DOCUMENTS

KR    2012-0019118 A    3/2012

* cited by examiner

*Primary Examiner* — Ko-Wei Lin
(74) *Attorney, Agent, or Firm* — Morgan Lewis & Bockius LLP (57) ABSTRACT

An air-conditioning vent structure includes a duct portion supported by a duct panel, the duct portion including first and second outlets formed at an upper portion thereof and separated by a partition, and a curvature portion including a curvature, a sliding door slidable along an upper portion of the curvature portion at a lower end portion of the partition, the sliding door including a hole to adjust opening widths of the first and second outlets in accordance with a degree of sliding, a driving portion connected to the sliding door at a lower end portion of the duct panel and configured to apply driving force to the sliding door so that the sliding door slides in opposite directions, and a controller electrically connected to the driving portion to perform a control operation to allow the sliding door to slide in opposite directions in accordance with a use mode.

16 Claims, 10 Drawing Sheets

DEF MODE

**DEF + VENT MODE
(VENT IS PRIORITIZED)**

FIG. 7

**DEF + VENT MODE
(DEF IS PRIORITIZED)**

ALL CLOSE

AIR-CONDITIONING VENT STRUCTURE

CROSS-REFERENCE TO RELATED APPLICATION

The present application claims priority to Korean Patent Application No. 10-2022-0027344, filed on Mar. 3, 2022, the entire contents of which is incorporated herein for all purposes by this reference.

BACKGROUND OF THE PRESENT DISCLOSURE

Field of the Present Disclosure

The present disclosure relates to an air-conditioning vent structure. More particularly, it relates to an air-conditioning vent structure configured for controlling an air-conditioning mode using a duct portion, the outlet of which is divided into a first outlet and a second outlet by a partition, and movement of a sliding door including a hole configured to adjust opening widths of the first outlet and the second outlet.

Description of Related Art

Recently, various functions in addition to the function of a simple transportation means have been implemented in vehicles, and development goals thereof are also changing. Generally, research focused on developing a vehicle having a faster and more powerful engine as a means of transportation is underway. Meanwhile, recently, many studies have been conducted on the development of a vehicle capable of providing a more comfortable and friendly environment as a second living space.

One of many studies is a study on an air-conditioning device configured to condition the air in a passenger compartment of a vehicle. The air-conditioning device is configured to primarily filter air flowing into the interior of a vehicle from, the outside thereof, to regulate the temperature and humidity of the air flowing thereinto, and to supply the same to the interior of the vehicle, providing a comfortable and pleasant environment in the vehicle.

The air conditioned through the air-conditioning device is used not only as air in the passenger compartment but also to implement various comfort functions. For example, a refrigerator and a cool air seat cushion are implemented using the air from the air-conditioning device.

To implement the above-described convenient functions, a duct is provided to separate air supplied from an air-conditioning device of a vehicle and to supply a same to each required place, which may require a lot of changes in the design of an air-conditioning device of the related art, or may complicate the arrangement of components in a vehicle.

Meanwhile, in an air-conditioning device for a vehicle, a cooler includes a compressor configured to compress a refrigerant, a condenser configured to condense the refrigerant compressed in the compressor, an expansion valve configured to cause the refrigerant condensed and liquefied in the condenser to be in a low-temperature and low-pressure state, and an evaporator configured to cool the air using the latent heat of evaporation of the refrigerant. Generally, such a cooling system lowers the temperature of the air and controls the absolute humidity thereof.

In the case of heating, when a coolant configured to cool an engine compartment removes engine heat and enters a high-temperature state, the coolant is used as a heat source. A heating system is formed of a heater core and a pump configured to circulate an engine coolant. In general, the heating system increases the temperature of the air and controls the relative humidity thereof.

However, in the case of eco-friendly vehicles using electricity as a power source, electricity is used to operate a compressor including a motor and is also used as an energy source for all devices such as a PTC element that replaces an engine coolant, and the present electricity is supplied from a battery. Accordingly, because the relationship between electricity and a battery is directly related to the range of the vehicle, reducing the amount of energy consumed by various devices is the biggest concern.

For example, to improve energy efficiency, an individual air-conditioning system, configured to reduce energy consumption by intensively air-conditioning the air around a driver's seat when only a driver is in a vehicle or when a passenger seat is not provided in a vehicle, has been studied.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an air-conditioning vent structure configured to divide an outlet provided in one duct into a first outlet and a second outlet using a partition, and to implement an upward discharge mode and heating and cooling modes separately or simultaneously as necessary using the Coandă effect.

Various aspects of the present disclosure are directed to providing an air-conditioning vent structure configured to allow one driving portion to move a sliding door, and to simultaneously control an air-conditioning mode of a driver's seat and an air-conditioning mode of a front passenger seat.

It is a further object of the present disclosure to provide an air-conditioning vent structure configured to intensively condition the air around a driver's seat by blocking a second outlet with a cover when only a driver is in a vehicle or when a passenger seat is not provided in a vehicle.

The objects of the present disclosure are not limited to the above-mentioned objects, and other objects not yet mentioned will be clearly understood by the following embodiments. Furthermore, the objects of the present disclosure may be realized by features, operations, and components indicated in the claims, and combinations thereof.

Various aspects of the present disclosure are directed to providing an air-conditioning vent structure including a duct portion supported by a duct panel, the duct portion including a first outlet and a second outlet formed at an upper portion thereof, the first outlet and the second outlet being separated by a partition, and a curvature portion including a curvature, the curvature being formed by causing one end portion of the duct portion disposed away from a windshield glass to be bent toward an interior of a vehicle, a sliding door configured to be slidable along an upper portion of the curvature portion at a lower end portion of the partition, the sliding door including a hole formed therein and configured to adjust opening widths of the first outlet and the second outlet depending on a degree of sliding thereof, a driving portion connected to the sliding door at a lower end portion of the duct panel and configured to apply driving force to the sliding door so that the sliding door slides in opposite directions, and a controller electrically connected to the driving portion and configured to perform a control operation of the driving portion to allow the sliding door to slide in opposite directions in accordance with a use mode.

In an exemplary embodiment of the present disclosure, the hole may include a first hole formed adjacent to the first outlet and to adjust the opening width of the first outlet, and a second hole formed to be spaced from the first hole with a predetermined distance and to adjust the opening width of the first outlet or the opening width of the second outlet.

In another exemplary embodiment of the present disclosure, the plurality of duct portions may be formed in a width direction of the duct panel.

In yet another exemplary embodiment of the present disclosure, at least one of the ducts may include a cover formed therein, the cover being configured to constantly close the second outlet.

In yet another exemplary embodiment of the present disclosure, the driving portion may be configured to move the sliding door to adjust the opening widths of the first outlets and the second outlets of the plurality of ducts, and to adjust the opening width of the first outlet of the duct portion including the cover formed therein, among the plurality of duct portions.

In still yet another exemplary embodiment of the present disclosure, the controller may perform, in an upward discharge mode, a control operation to move the sliding door so that the first outlet is fully opened through the second hole and the second outlet is completely closed.

In a further exemplary embodiment of the present disclosure, the controller may perform, in a mixed mode, a control operation to move the sliding door so that the opening width of the first outlet is adjusted by the first hole or the second hole and the opening width of the second outlet is adjusted by the second hole.

In another further exemplary embodiment of the present disclosure, the controller may perform, in a mixed mode, a control operation to move the sliding door so that the opening width of the first outlet opened through the second hole is smaller than the opening width of the second outlet opened through the second hole.

In yet another further exemplary embodiment of the present disclosure, the controller may perform, in a mixed mode, a control operation to move the sliding door so that the opening width of the first outlet opened through the first hole is smaller than the opening width of the second outlet opened through the second hole.

In yet another further exemplary embodiment of the present disclosure, the controller may perform, in heating and cooling modes, a control operation to move the sliding door so that the first outlet is completely closed and the second outlet is completely opened through the second hole.

In still yet another further exemplary embodiment of the present disclosure, the controller may perform, in a closed mode, a control operation to move the sliding door so that the first outlet and the second outlet are completely closed.

In a still further exemplary embodiment of the present disclosure, the second hole may be formed to correspond to maximum opening widths of the first outlet and the second outlet in a mixed mode.

In a yet still further exemplary embodiment of the present disclosure, a separation distance between the first hole and the second hole may be formed to completely close the opening width of the first outlet in heating and cooling modes.

In a yet exemplary embodiment of the present disclosure, the first hole may be formed so that the opening width of the first outlet opened through the first hole is greater than the opening width of the second outlet opened through the second hole when the sliding door is moved to enter a mixed mode.

In a yet further exemplary embodiment of the present disclosure, the air-conditioning vent structure may further include a sliding door guide formed on one surface of the duct portion and configured to move the sliding door.

In yet another further exemplary embodiment of the present disclosure, air discharged from the second outlet may be configured to be deflected along the curvature portion formed in the second outlet.

Other aspects and exemplary embodiments of the present disclosure are discussed infra.

It is understood that the terms "vehicle", "vehicular", and other similar terms as used herein are inclusive of motor vehicles in general, such as passenger vehicles including sports utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, vehicles powered by both gasoline and electricity.

The above and other features of the present disclosure are discussed infra.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes, will be determined in part by the particularly intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the present disclosure will be described in conjunction with exemplary embodiments of the present disclosure, it will be understood that present description is not intended to limit the present disclosure to those exemplary embodiments of the present disclosure. On the other hand, the present disclosure is directed to cover not only the exemplary embodiments of the present disclosure, but also various alternatives, modifications, equivalents and other embodiments, which may be included within the spirit and scope of the present disclosure as defined by the appended claims. The exemplary embodiments are provided to more clearly explain an exemplary embodiment of the present disclosure to those of ordinary skill in the art.

Furthermore, the term "unit" used in the present specification means a unit that processes at least one function or operation, which may be implemented by hardware or a combination of hardware.

Furthermore, the terms "upper" and "lower" used in the present specification are based on the height direction in the drawings.

Additionally, in the present specification, terms such as "first" and/or "second" may be used to describe various components, but the components are not limited by the terms. The terms are used only for distinguishing one component from other components. For example, a first component may be referred to as a second component, and similarly, a second component may also be referred to as a first component without departing from the scope of rights according to the concept of the present disclosure.

Furthermore, in the present specification, when one component is referred to as being disposed "above" or "at the upper portion of" the other component, the one component may be disposed "directly above" or "directly at the upper portion of" the other component, but it should be understood that other components may be present therebetween. Additionally, when the one component is referred to as being "under" or "below" the other component, the one component may be disposed "directly under" or "directly below" the other component, but it should be understood that other components may be present therebetween.

Furthermore, in the present specification, an "opening width" means a width when a duct portion 100 is viewed vertically from the top corresponding to inclination thereof.

Figure 1:
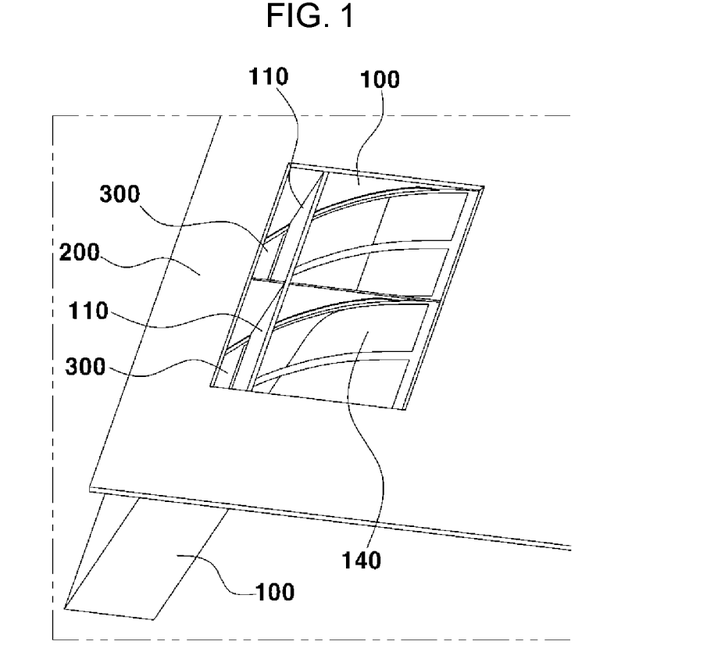
FIG. 1 shows a perspective view of an air-conditioning vent structure according to various exemplary embodiments of the present disclosure.
Figure 2:
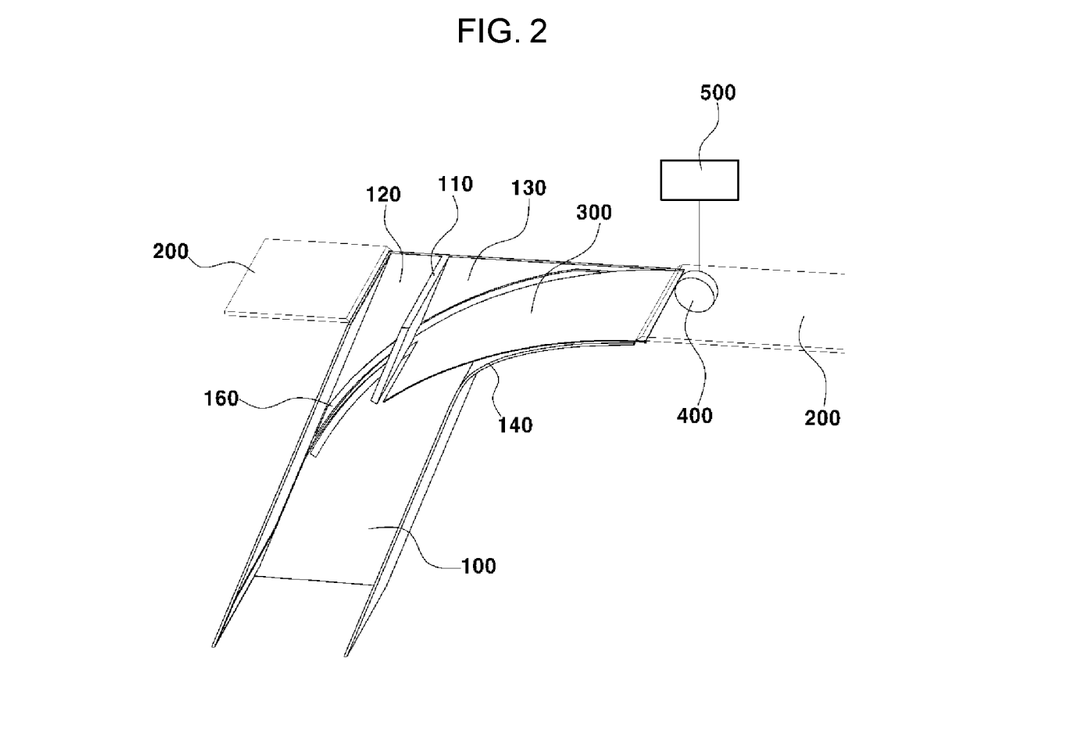
FIG. 2 shows a positional relationship between components of the air-conditioning vent structure according to the exemplary embodiment of the present disclosure.

FIG. 1 shows a perspective view of an air-conditioning vent structure according to various exemplary embodiments of the present disclosure, and FIG. 2 shows a positional relationship between components of the air-conditioning vent structure according to the exemplary embodiment of the present disclosure.

Referring to FIG. 1 and FIG. 2, the air-conditioning vent structure according to the exemplary embodiment of the present disclosure may include a duct portion 100, a duct panel 200, a sliding door 300, a driving portion 400, and a controller 500. The duct portion 100 may include a first outlet 120 and a second outlet 130, separated by a partition 110, and a curvature portion 140 which implements the Coandă effect.

The duct portion 100 may include the first outlet 120 and the second outlet 130 separated by the partition 110 and formed at the upper portion thereof. The partition 110 may be located at the upper portion of the duct portion 100 to allow air supplied from an air-conditioning device to be discharged through the first outlet 120 or the second outlet 130. The duct portion 100 may have a predetermined inclination in consideration of the direction in which air is required to flow. The partition 110 may be formed at the upper end portion of the duct portion 100 corresponding to the inclination of the duct portion 100.

The air-conditioning vent structure according to the exemplary embodiment of the present disclosure may be configured to control defrosting performance or dehumidification performance by adjusting the amount of air sprayed on the windshield glass. The air sprayed on the windshield glass may be sprayed in a direct blowing method or may be sprayed in an indirect blowing method. The first outlet 120 may be configured to discharge air to dehumidify or defrost the front windshield glass of a vehicle. The duct portion 100 may be configured to receive air from the air-conditioning device and discharge the same to the windshield glass through the first outlet 120. According to the exemplary embodiment of the present disclosure, the air discharged through the first outlet 120 may move upwards in a straight line.

Meanwhile, the air-conditioning vent structure according to the exemplary embodiment of the present disclosure may be configured to adjust the airflow direction by applying the Coandă effect. That is, the airflow direction may be adjusted using the Coandă effect which is a phenomenon in which a jet flow adheres to a nearby surface due to the viscosity of a fluid and remains adhered even when the surface curves away from the initial jet direction thereof.

The duct portion 100 may include the curvature portion 140 including a curvature. Here, one end portion of the duct portion 100 which is disposed away from the windshield glass is bent toward the interior of the vehicle, forming the curvature. The curvature portion 140, configured to discharge air toward the interior of the vehicle using the Coandă effect, may be formed at one end portion of the upper portion of the duct portion 100. The air supplied to the duct portion 100 may be configured to flow along the surface of the curvature portion 140.

In the exemplary embodiment of the present disclosure, the curvature portion 140 may be connected to a skin surface of a dashboard garnish to be connected to the second outlet 130. The air supplied from the air-conditioning device may be discharged to the second outlet 130 along the curvature portion 140 to be directed toward the interior of the vehicle.

The air-conditioning vent structure according to the exemplary embodiment of the present disclosure may be configured to control heating and cooling by adjusting the air amount blown into the interior of the vehicle. The second outlet 130 may be configured to discharge air for heating and cooling into the interior of the vehicle. The duct portion 100 may be configured to receive air from the air-conditioning device and discharge the air into the interior of the vehicle through the second outlet 130.

The air rising along the curvature portion 140 may be discharged through the second outlet 130. In the exemplary embodiment of the present disclosure, the air discharged through the second outlet 130 may move along the curvature portion 140 and then may move upwards. In another exemplary embodiment of the present disclosure, the air discharged through the second outlet 130 may move along the curvature portion 140 and then may move downwards from the end portion of the curvature portion 140.

The duct panel 200 may be formed at opposite upper end portions of the duct portion 100 to support the duct portion 100. As shown in FIG. 1, the duct panel 200 may be formed at the opposite upper end portions of the duct portion 100, and may extend in the width direction of the duct portion 100. A plurality of duct portions 100 may be formed in the width direction of the duct panel 200.

The sliding door 300 may be configured to slide along the upper portion of the curvature portion 140 at the lower end portion of the partition 110. The sliding door 300 may be formed in a curved shape so that one end portion thereof is formed along one surface of the duct portion 100 and the other end portion thereof is formed along the curvature portion 140 formed on the other surface of the duct portion 100. The sliding door 300 may be configured to be in contact with the lower end portion of the partition 110 and to move to avoid interference between the sliding door 300 and the lower end portion of the partition 110. Accordingly, the air discharged through the first outlet 120 may not leak through the second outlet 130, and the air discharged through the second outlet 130 may not leak through the first outlet 120.

Meanwhile, the sliding door 300 may have a hole configured to adjust the opening widths of the first outlet 120 and the second outlet 130 depending on a sliding degree of the sliding door 300. The hole may include a first hole 311 and a second hole 312 to adjust the opening widths of the first outlet 120 and the second outlet 130. The sliding door 300 may be configured to adjust the opening widths of the first outlet 120 and the second outlet 130 depending on the position thereof, allowing the required air amount to be discharged through the first outlet 120 and the second outlet 130. The sliding door 300 may be configured to prevent air from being discharged through the first outlet 120 and the second outlet 130, and may be configured to allow air to be discharged through the first hole 311 and the second hole 312.

The first hole 311 may be formed adjacent to the first outlet 120, and may be configured to adjust the opening width of the first outlet 120. The second hole 312 may be formed to be spaced from the first hole 311 with a predetermined distance, and may be configured to adjust the opening width of the first outlet 120 or the opening width of the second outlet 130.

The sliding door guide 160 may be formed on one surface of the duct portion 100, and may be configured to allow the sliding door 300 to be movable. The sliding door guide 160 may be formed on one surface of the duct portion 100 while corresponding to the curvature of the sliding door 300, and may guide the sliding door 300 to allow the same to be slidable to a predetermined position.

The driving portion 400 may be connected to the sliding door 300 at the lower end portion of the duct panel 200, and may be configured to apply driving force so that the sliding door 300 slides in opposite directions. According to the exemplary embodiment of the present disclosure, the driving portion 400 may be an actuator. The air-conditioning vent structure according to the exemplary embodiment of the present disclosure may be configured to simultaneously implement dehumidification and heating/cooling using one driving portion 400. The driving portion 400 may be configured to move the sliding door 300 to adjust the opening widths of the first outlet 120 and the second outlet 130 of the plurality of duct portions 100.

The hole of the sliding door 300 may be configured to adjust the opening widths of the first outlet 120 and the second outlet 130. The driving portion 400 may be configured to move the sliding door 300 to adjust the opening widths thereof when the first outlet 120 and the second outlet 130 overlap the hole 310.

The duct panel 200 may be configured to support the sliding door 300 and the duct portion 100. The driving portion 400 may be positioned at the lower end portion of the duct panel 200, and may apply driving force so that the sliding door 300 slides under the duct panel 200. The driving portion 400 may apply driving force to adjust a movement direction of the sliding door 300 and a movement distance thereof. One end portion of the sliding door 300 which is connected to the driving portion 400 slides under the duct panel 200. Accordingly, the sliding door 300 may be configured to be visible only through the first outlet 120 and the second outlet 130.

The controller 500 may be connected to the driving portion 400, and may perform a control operation to allow the sliding door 300 to be slidable in the opposite directions in accordance with the use mode. The controller 500 may be configured to receive an input signal of the use mode to control the movement direction and the movement distance of the sliding door 300. The controller 500 may perform a control operation to fix the position of the sliding door 300 in consideration of the positions of the first hole 311 and the second hole 312 in response to the input signal of the use mode.

Figure 3:
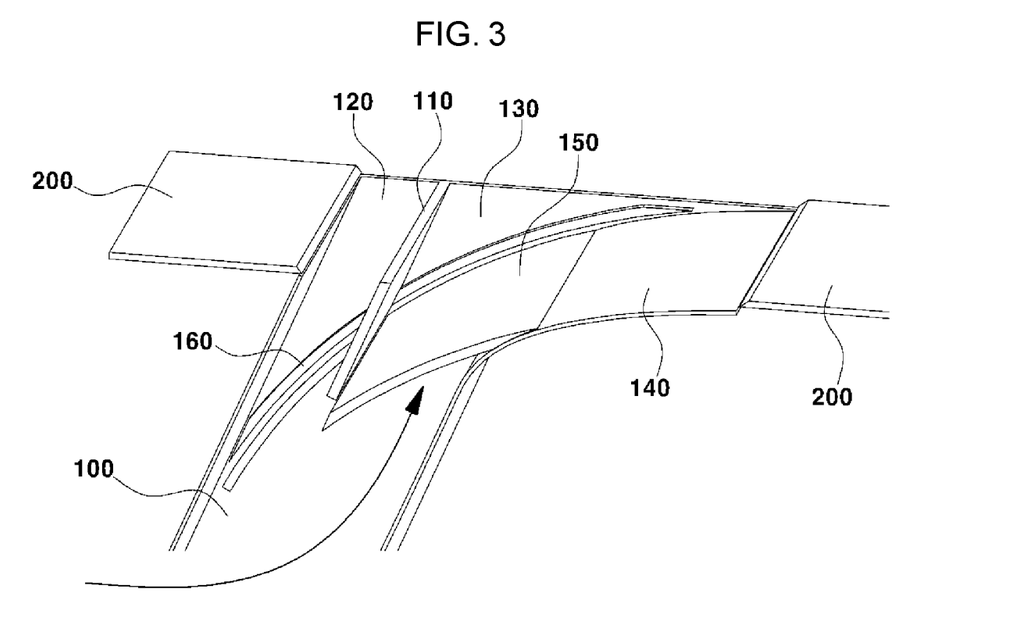
FIG. 3 shows a cross-sectional view of an air-conditioning vent structure cover according to the exemplary embodiment of the present disclosure.

FIG. 3 shows a cross-sectional view of an air-conditioning vent structure cover according to the exemplary embodiment of the present disclosure.

Referring to FIG. 3, the air-conditioning vent structure according to the exemplary embodiment of the present disclosure may include a cover 150 formed in at least one of the plurality of duct portions 100. The cover 150 may be configured to constantly close the second outlet 130 in at least one of the plurality of duct portions 100.

The driving portion 400 may be configured to move the sliding door 300 to adjust the opening widths of the first outlet 120 and the second outlet 130 of the plurality of duct portions 100, and may be configured to simultaneously adjust the opening width of the first outlet 120 of the duct portion 100, including the cover 150 formed therein, among the plurality of duct portions 100.

In the exemplary embodiment of the present disclosure, the duct portion 100, including the cover 150 formed therein, may be formed at the position of a front passenger seat. The cover 150 may be fixedly coupled to at least one of the plurality of duct portions 100. The cover 150 may be configured to constantly close the second outlet 130 in consideration of the state in which heating and cooling are not required when no passenger is accommodated in the front passenger seat. The cover 150 may be connected to the curvature portion 140, and may extend up to the lower end portion of the partition 110. The sliding door 300 may be configured to move along the upper surface of the cover 150. The cover 150 may be formed to correspond to the curvature of the sliding door 300.

According to the exemplary embodiment of the present disclosure, one sliding door 300 may be configured to move to condition the air on the sides of the driver's seat and the front passenger seat as necessary. To the present end, the cover 150 may be formed in the duct portion 100 corresponding to a position at which heating and cooling are not required.

The duct portion 100, including the cover 150 formed therein, may be configured to allow air to be discharged only through the first outlet 120. The cover 150 may be configured to prevent air from being discharged through the second outlet 130 even when the sliding door 300 moves and the second hole 312 is positioned corresponding to the position of the second outlet 130.

Hereinafter, a method of implementing an upward discharge mode, a mixed mode, and heating and cooling modes of the air-conditioning vent structure according to the exemplary embodiment of the present disclosure will be described. The upward discharge mode may correspond to the case in which it is necessary to remove fog or frost from the windshield glass and heating/cooling is not required. The upward discharge mode may include the case in which air is required to be indirectly blown upwards. The mixed mode may include cases in which both dehumidification and heating/cooling are simultaneously required. The heating and cooling modes may correspond to the case in which dehumidification is not required and heating/cooling is required. A closed mode may mean the case in which neither dehumidification nor heating/cooling is required.

Figure 4:
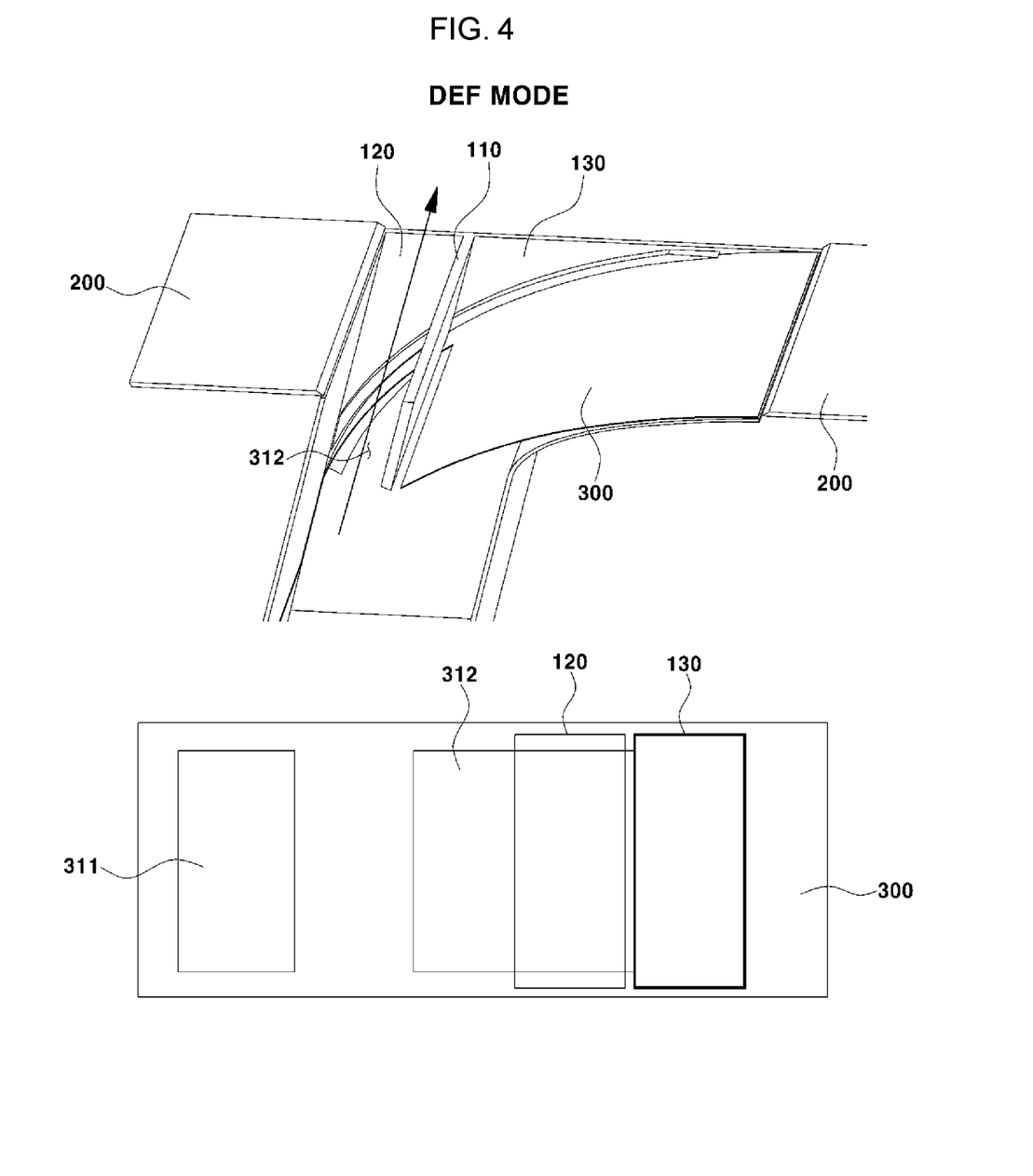
FIG. 4 shows an upward discharge mode of the air-conditioning vent structure according to the exemplary embodiment of the present disclosure.

FIG. 4 is a view showing the upward discharge mode of the air-conditioning vent structure according to the exemplary embodiment of the present disclosure.

Referring to FIG. 4, the controller 500 may perform, in the upward discharge mode, a control operation to move the sliding door 300 so that the first outlet 120 is completely opened through the second hole 312 and the second outlet 130 is completely closed. Upon receiving an upward discharge mode signal, the controller 500 may perform a control operation to move the position of the sliding door 300 so that the first outlet 120 is completely opened through the second hole 312.

In the upward discharge mode, the first outlet 120 may be completely opened to allow air to rise vertically. In the upward discharge mode, the second outlet 130 may be completely closed by the sliding door 300 to prevent air from being discharged therethrough.

Figure 5:
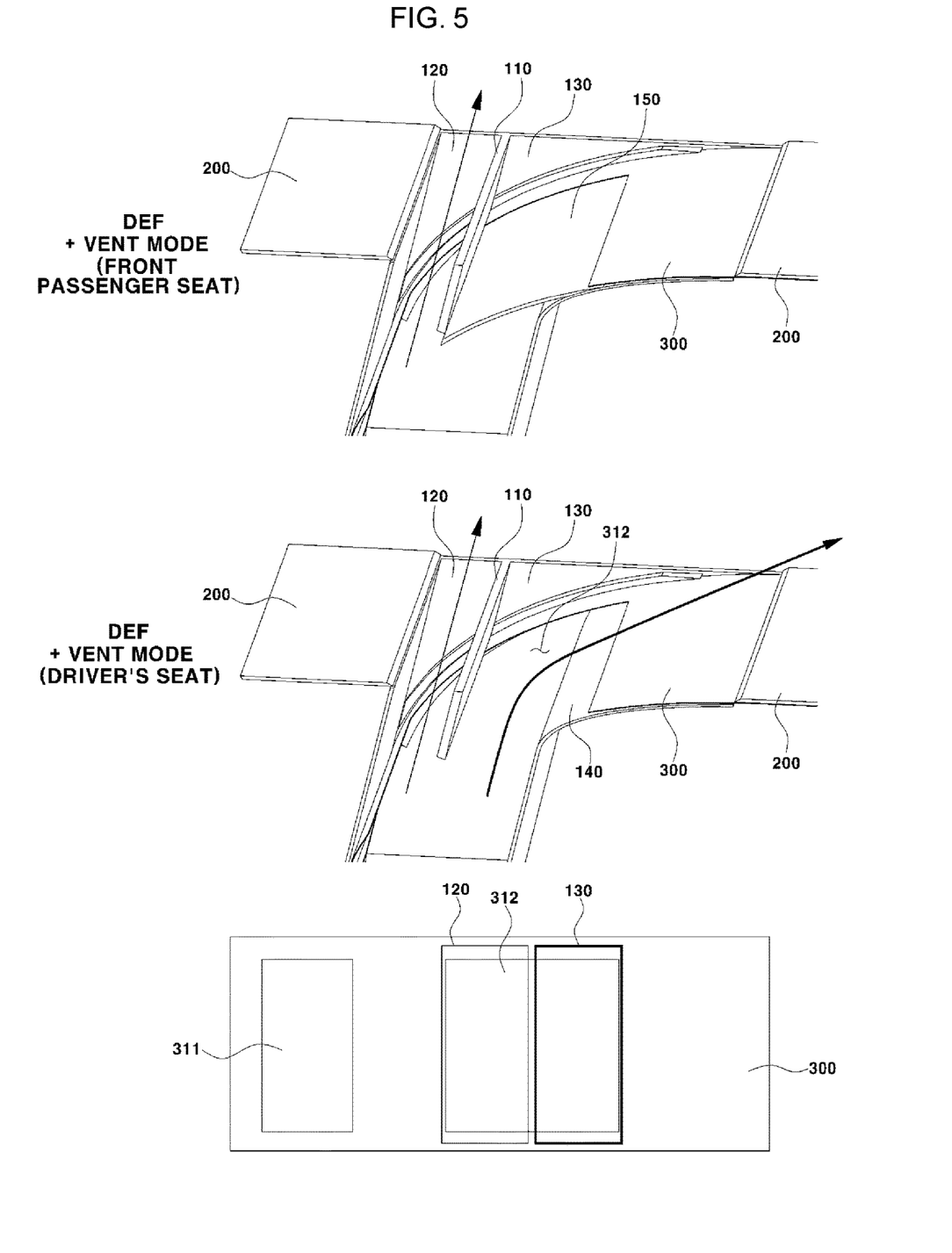
FIG. 5 shows a mixed mode of the air-conditioning vent structure according to the exemplary embodiment of the present disclosure.

FIG. 5 shows the mixed mode of the air-conditioning vent structure according to the exemplary embodiment of the present disclosure.

Referring to FIG. 5, the controller 500 may perform, in the mixed mode, a control operation to move the sliding door 300 so that the opening width of the first outlet 120 is adjusted by the first hole 311 or the second hole 312 and the opening width of the second outlet 130 is adjusted by the second hole 312. In the exemplary embodiment of the present disclosure, the first outlet 120 may be opened through the first hole 311 or may be opened through the second hole 312, and the second outlet 130 may be opened through the second hole 312.

In the exemplary embodiment of the present disclosure, when defogging of the windshield glass and heating/cooling are required simultaneously, as shown in FIG. 5, the first outlet 120 and the second outlet 130 may be simultaneously opened through the second hole 312. In another exemplary embodiment of the present disclosure, when a driver wants to remove the fog from the windshield glass as rapidly as possible while simultaneously requiring defogging of the windshield glass and the heating/cooling, the first outlet 120 and the second outlet 130 may be simultaneously opened through the second hole 312, and only the first outlet 120 may be completely opened.

Upon receiving a signal indicating switching from the upward discharge mode to the mixed mode, the controller 500 may perform a control operation to move the sliding door 300 to the right side in the drawing. The controller 500 may perform, in the mixed mode, the control operation to adjust the opening widths of the first outlet 120 and the second outlet 130 by adjusting the movement distance of the sliding door 300.

In the mixed mode, the first outlet 120 may be completely opened to allow air to rise vertically. In the mixed mode, the second outlet 130 may be completely opened to allow air to move along the curvature portion 140 to be discharged therethrough.

Meanwhile, in the mixed mode, the second outlet 130 on the side of the front passenger seat may be completely closed by the cover 150 so that air is prevented from being discharged therethrough. For example, in the case of a vehicle in which a front passenger seat is not provided in the vehicle, because there is no passenger on the front passenger seat side, the vehicle may be configured only to defrost or dehumidify the windshield glass without performing heating and cooling on the front passenger seat side thereof.

Figure 6:
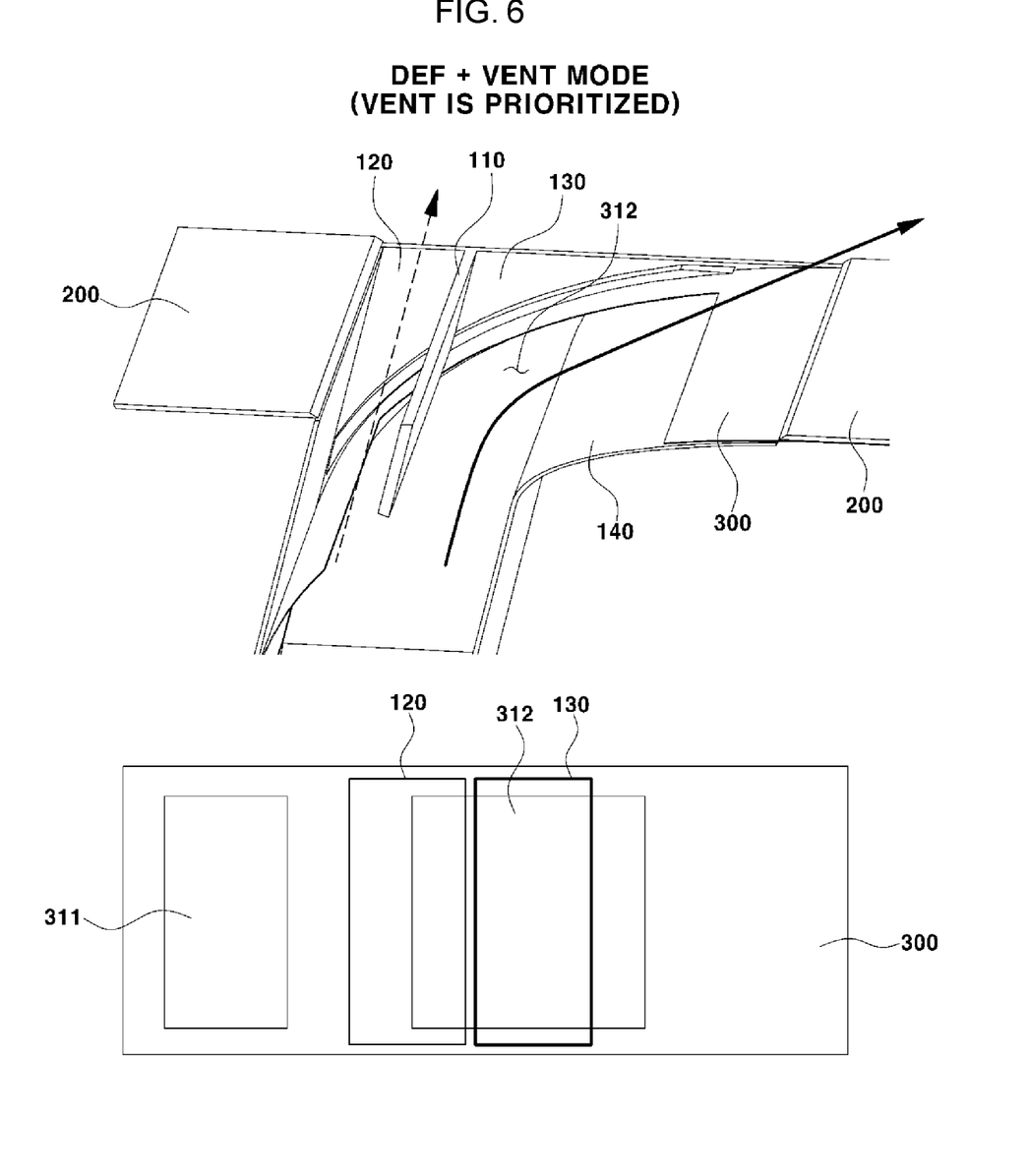
FIG. 6 shows the case in which heating and cooling are prioritized in the mixed mode of the air-conditioning vent structure according to the exemplary embodiment of the present disclosure.

FIG. 6 shows the case in which heating and cooling are prioritized in the mixed mode of the air-conditioning vent structure according to the exemplary embodiment of the present disclosure.

Referring to FIG. 6, the controller 500 may perform, in the mixed mode, a control operation to move the sliding door 300 so that the opening width of the first outlet 120 opened through the second hole 312 is smaller than the opening width of the second outlet 130 opened through the second hole 312. In the instant case, the first outlet 120 may be opened through the second hole 312, and the second outlet 130 may be completely opened through the second hole 312.

In the exemplary embodiment of the present disclosure, when defogging of the windshield glass and heating/cooling are simultaneously required and the heating/cooling is required more, the opening width of the first outlet 120 opened through the second hole 312 may be configured to be smaller than the opening width of the second outlet 130.

In the exemplary embodiment of the present disclosure, upon receiving a signal that prioritizes heating and cooling in the mixed mode, the controller 500 may perform a control operation to move the sliding door 300 to the right side in the drawing of FIG. 5. In the instant case, the controller 500 may adjust the movement distance of the sliding door 300, and may fix the sliding door 300 so that the opening width of the first outlet 120 opened through the second hole 312 is smaller than the opening width of the second outlet 130.

Figure 7:
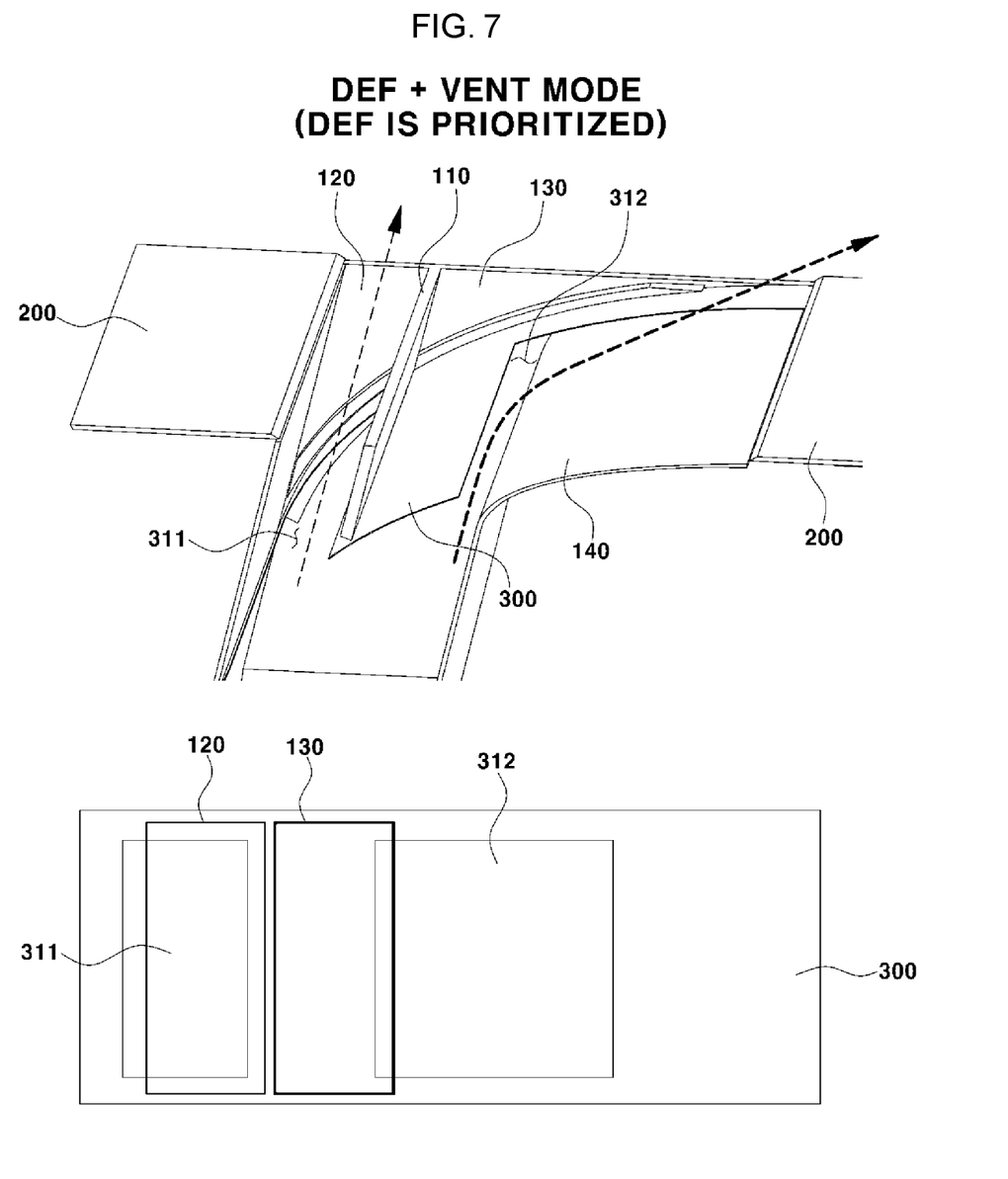
FIG. 7 shows the case in which dehumidification is prioritized in the mixed mode of the air-conditioning vent structure according to the exemplary embodiment of the present disclosure.

FIG. 7 shows the case in which dehumidification is prioritized in the mixed mode of the air-conditioning vent structure according to the exemplary embodiment of the present disclosure.

Referring to FIG. 7, the controller 500 may perform, in the mixed mode, a control operation to move the sliding door 300 so that the opening width of the first outlet 120 opened through the first hole 311 is greater than the opening width of the second outlet 130 opened through the second hole 312. In the instant case, at least a portion of the first outlet 120 may be opened through the first hole 311, and a least a portion of the second outlet 130 may be opened through the second hole 312.

In the exemplary embodiment of the present disclosure, when defogging of the windshield glass through dehumidification and heating/cooling are simultaneously required and dehumidification is required more, the opening width of the first outlet 120 opened through the first hole 311 may be greater than the opening width of the second outlet 130 opened through the second hole 312.

In the exemplary embodiment of the present disclosure, upon receiving a signal that prioritizes dehumidification in the mixed mode, the controller 500 may perform a control operation to move the sliding door 300 to the right side in the drawing with reference to FIG. 6. In the instant case, the controller 500 may adjust the movement distance of the sliding door 300, and may fix the sliding door 300 so that the opening width of the first outlet 120 opened through the first hole 311 is greater than the opening width of the second outlet 130 opened through the second hole 312.

Figure 8:
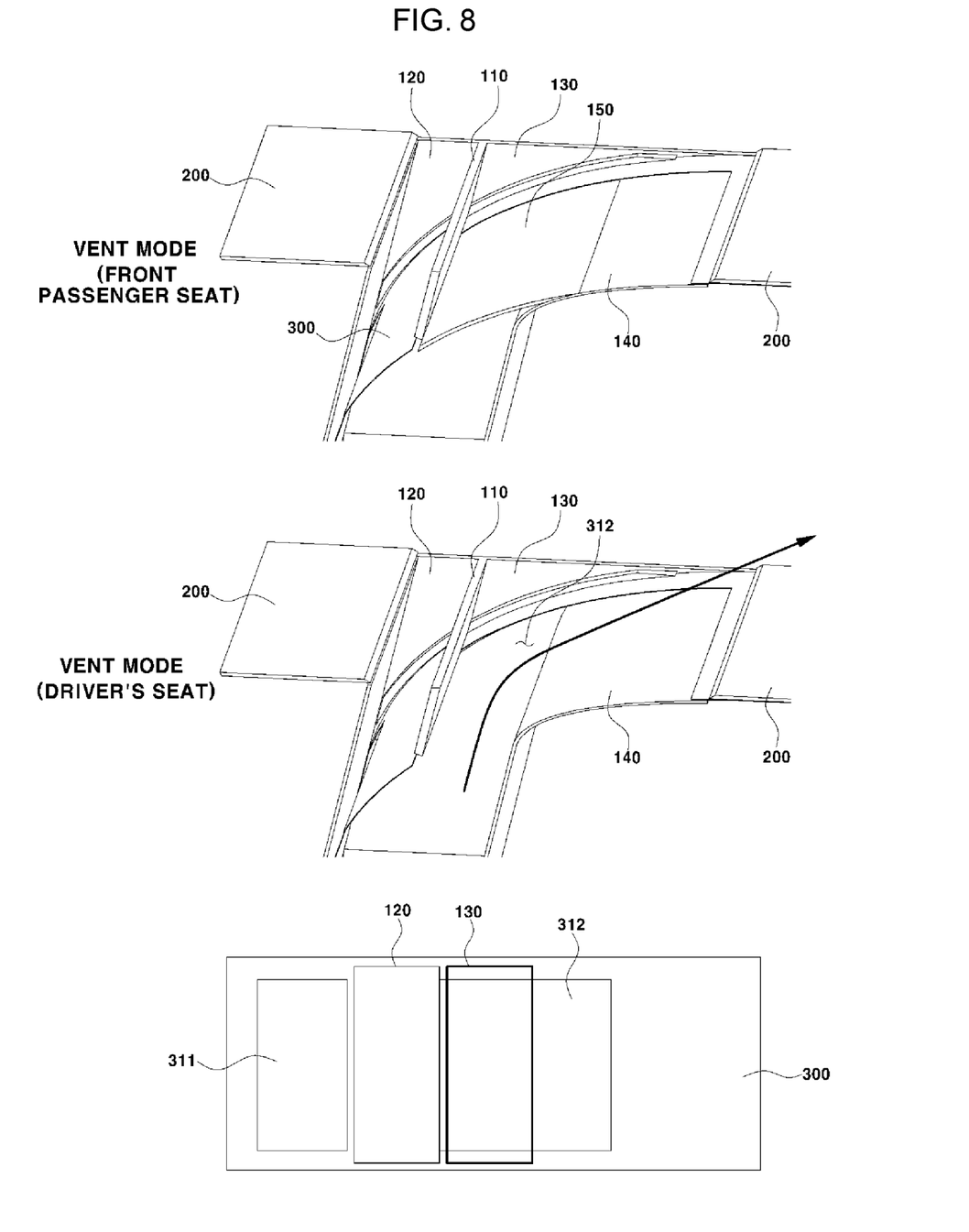
FIG. 8 shows heating and cooling modes of the air-conditioning vent structure according to the exemplary embodiment of the present disclosure.

FIG. 8 shows heating and cooling modes of the air-conditioning vent structure according to the exemplary embodiment of the present disclosure.

Referring to FIG. 8, the controller 500 may perform, in the heating and cooling modes, a control operation to move the sliding door 300 so that the first outlet 120 is completely closed and the second outlet 130 is completely opened through the second hole 312. Upon receiving a signal indicating the heating and cooling modes, the controller 500 may perform a control operation to move the position of the sliding door 300 so that the second outlet 130 is completely opened through the second hole 312.

In the heating and cooling modes, the second outlet 130 may be completely opened to allow air to rise in a curved line along the curvature portion 140. In the heating and cooling modes, the first outlet 120 may be completely closed by the sliding door 300 to prevent air from being discharged therethrough.

In the exemplary embodiment of the present disclosure, upon receiving a signal indicating heating and cooling, the controller 500 may perform a control operation to move the sliding door 300 to the left side in the drawing with reference to FIG. 7. In the instant case, the controller 500 may adjust the movement distance of the sliding door 300, and may fix the sliding door 300 so that the first outlet 120 is completely closed and the second outlet 130 is fully opened.

Meanwhile, in the heating and cooling modes, the first outlet 120 on the side of the front passenger seat may be completely closed by the sliding door 300, and the second outlet 130 may be completely closed by the cover 150 to prevent air from being discharged therethrough.

Figure 9:
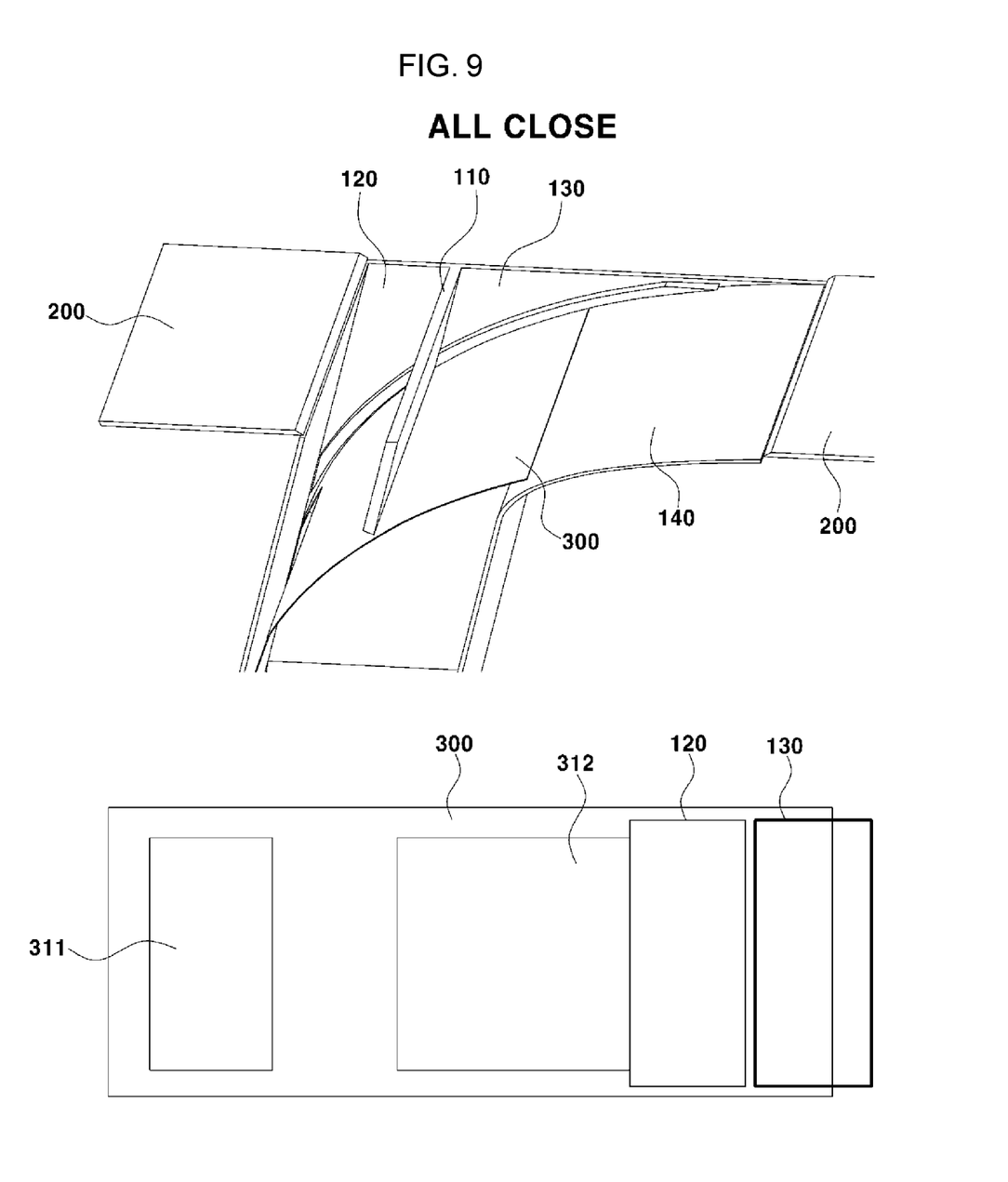
FIG. 9 shows a closed mode of the air-conditioning vent structure according to the exemplary embodiment of the present disclosure.

FIG. 9 shows a closed mode of the air-conditioning vent structure according to the exemplary embodiment of the present disclosure.

Referring to FIG. 9, the controller 500 may perform, in the closed mode, a control operation to move the sliding door 300 so that the first outlet 120 and the second outlet 130 are completely closed. In the exemplary embodiment of the present disclosure, upon receiving a closing signal, the controller 500 may perform a control operation to move the sliding door 300 to the left side in the drawing with reference to FIG. 8. In the instant case, the controller 500 may adjust the movement distance of the sliding door 300, and may fix the sliding door 300 so that the first outlet 120 and the second outlet 130 are completely closed by the sliding door 300 adjacent to the second hole 312.

Figure 10:
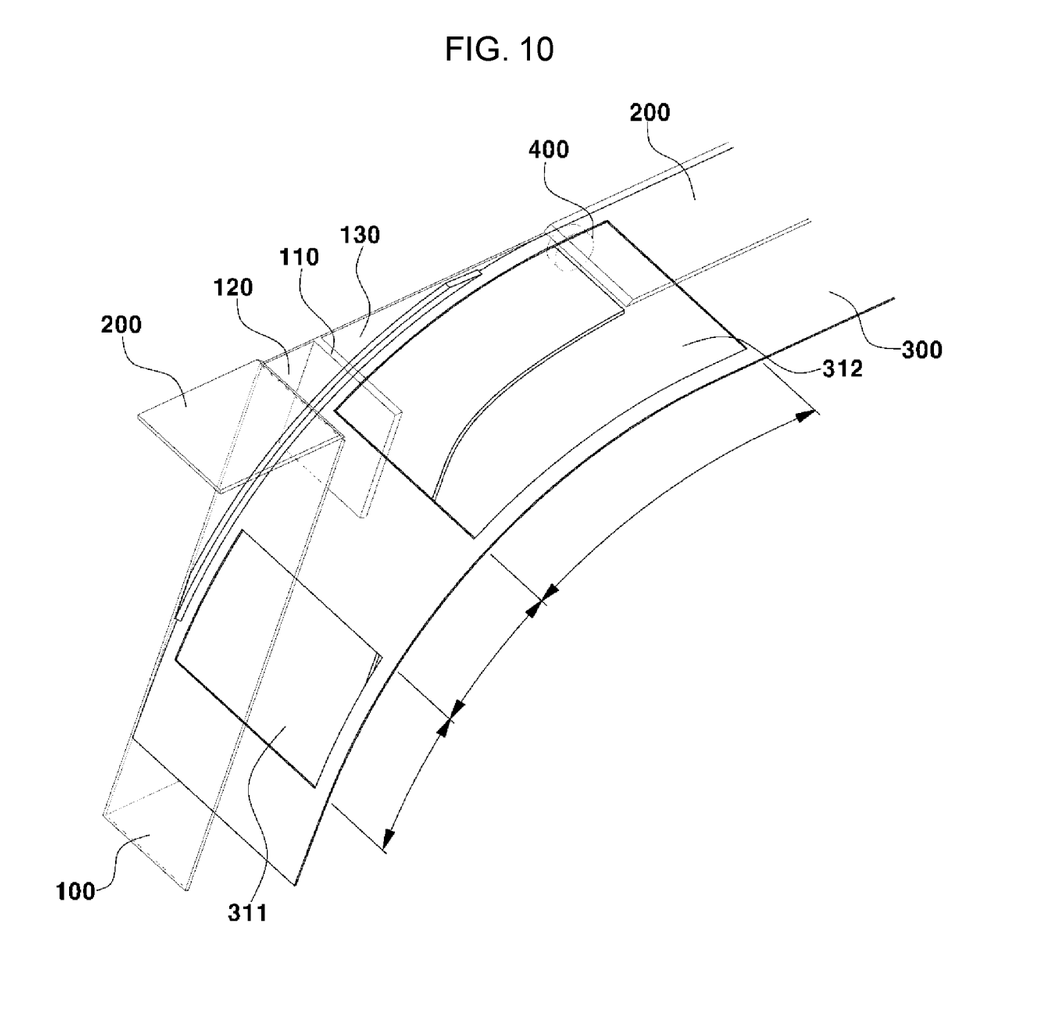
FIG. 10 shows a perspective view of a first hole and a second hole of a sliding door in the air-conditioning vent structure according to the exemplary embodiment of the present disclosure.

FIG. 10 shows a perspective view of the first hole 311 and the second hole 312 of the sliding door 300 in the air-conditioning vent structure according to the exemplary embodiment of the present disclosure.

Referring to FIG. 10, the first hole 311 and the second hole 312 may be formed in consideration of the first outlet 120, the second outlet 130, and the curvature of the sliding door 300. The second hole 312 may be formed to correspond to the maximum opening widths of the first outlet 120 and the second outlet 130 in the mixed mode. In other words, the second hole 312 may be formed so that the first outlet 120 and the second outlet 130 are completely opened simultaneously through the second hole 312.

A separation distance between the first hole 311 and the second hole 312 may be formed to completely close the opening width of the first outlet 120 in the heating and cooling modes. In the state in which the sliding door 300 is moved to enter the mixed mode, the first hole 311 may be formed so that the opening width of the first outlet 120 opened through the first hole 311 is greater than the opening width of the second outlet 130 opened through the second hole 312. The first hole 311 may be formed from the end portion of the second hole 312 to the surface in contact with the duct portion 100 in the state in which dehumidification is prioritized in the mixed mode as shown in FIG. 7.

Figure 11:
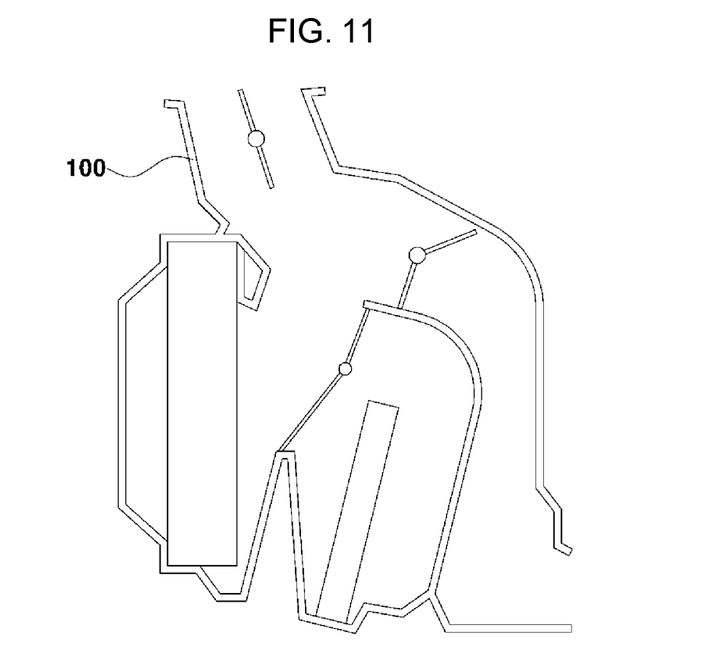
FIG. 11 shows a cross-sectional view of an air-conditioning system of a vehicle to which the air-conditioning vent structure according to the exemplary embodiment of the present disclosure is applied.
Figure 12:
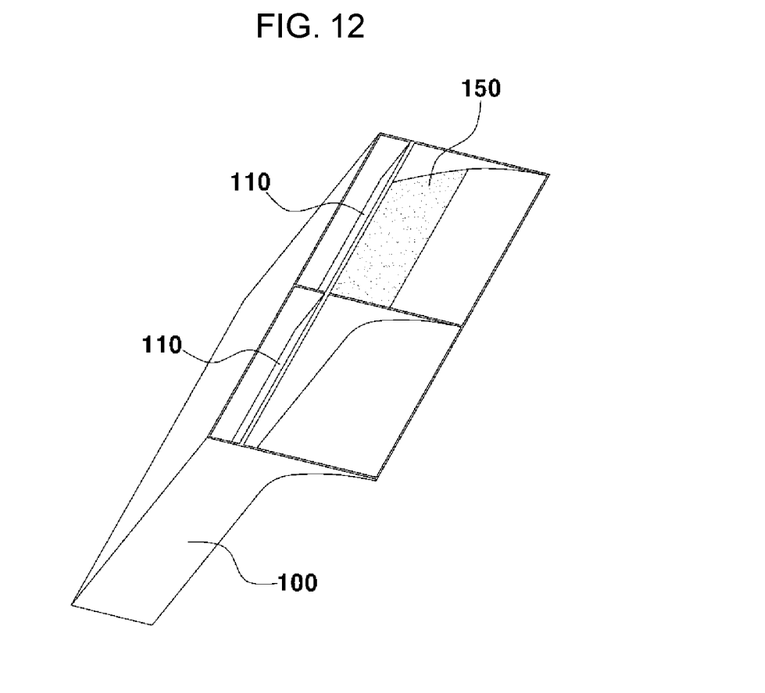
FIG. 12 is a perspective view showing a difference between the air-conditioning vent structures for a driver's seat and a passenger seat according to the exemplary embodiment of the present disclosure.

FIG. 11 shows a cross-sectional view of an air-conditioning system of a vehicle to which the air-conditioning vent structure according to the exemplary embodiment of the present disclosure is applied, and FIG. 12 is a perspective view showing a difference between the air-conditioning vent structures for a driver's seat and a front passenger seat according to the exemplary embodiment of the present disclosure.

Referring to FIG. 11 and FIG. 12, the air-conditioning vent structure according to the exemplary embodiment of the present disclosure may have a configuration in which the first outlet 120 and the second outlet 130 are integrated into one outlet. That is, the air-conditioning vent structure according to the exemplary embodiment of the present disclosure may be formed in a structure configured for performing heating and cooling and dehumidification separately or simultaneously through one air-conditioning outlet using the Coandă effect. As a result, a separate air vent may be eliminated, making it possible to reduce costs and implement a minimal dashboard design. Furthermore, various airflow direction modes may be implemented depending on the movement distance of the sliding door 300 in addition to standardized air-conditioning airflow direction modes of the related art. Meanwhile, the same driving portion 400 is used to move one sliding door 300, making it possible to control air conditioning of the driver's seat and the front passenger seat. Accordingly, it is possible to reduce costs. The cover 150 may be configured to close the second outlet 130 on the side of the front passenger seat, and may be configured only to defrost or dehumidify the windshield glass of the vehicle without performing heating and cooling when there is no passenger on the front passenger seat side thereof.

In summary, various aspects of the present disclosure are directed to providing an air-conditioning vent structure configured for controlling an air-conditioning mode using the duct portion 100, the outlet of which includes the first outlet 120 and the second outlet 130 by the partition 110, and the movement of the sliding door 300 including the hole configured to adjust the opening widths of the first outlet 120 and the second outlet 130.

As is apparent from the above description, the present disclosure may obtain the following effects through configurations, a combination of the configurations, and the use relationship between the configurations described in the exemplary embodiments of the present disclosure.

It is possible to implement an upward discharge mode and heating and cooling modes separately or simultaneously as necessary using the Coandă effect by dividing an outlet provided in one duct into a first outlet and a second outlet using a partition, including an effect of simplifying the design of a vehicle air-conditioning device.

Furthermore, one driving portion is used to move a sliding door, making it possible to simultaneously control air-conditioning modes of a driver's seat and a front passenger seat. Accordingly, it is possible to have an effect of reducing component costs.

Furthermore, it is possible to intensively condition the air around the driver's seat by blocking the second outlet with a cover when only a driver is in a vehicle or when a passenger seat is not provided in a vehicle, including an effect of reducing energy consumption.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An air-conditioning vent structure comprising:
at least one duct portion supported by a duct panel, the at least one duct portion including a first outlet and a second outlet formed at an upper portion thereof, the first outlet and the second outlet being separated by a partition, and a curvature portion including a curvature, the curvature being formed by causing one end portion of the at least one duct portion disposed away from a windshield glass to be bent toward an interior of a vehicle;
a sliding door configured to be slidable along an upper portion of the curvature portion at a lower end portion of the partition, the sliding door including a hole formed therein and configured to adjust opening widths of the first outlet and the second outlet depending on a degree of sliding thereof;

an actuator connected to the sliding door at a lower end portion of the duct panel and configured to apply driving force to the sliding door so that the sliding door slides in opposite directions; and a controller electrically connected to the actuator and configured to perform a control operation of the actuator to allow the sliding door to slide in the opposite directions in accordance with a use mode.

2. The air-conditioning vent structure of claim 1, wherein the hole includes:

a first sub hole formed adjacent to the first outlet and to adjust the opening width of the first outlet, and a second sub hole formed to be spaced from the first sub hole with a predetermined distance and to adjust the opening width of the first outlet or the opening width of the second outlet.

3. The air-conditioning vent structure of claim 1, wherein the at least one duct portion is disposed in a width direction of the duct panel.

4. The air-conditioning vent structure of claim 3, wherein the at least one duct portion includes a cover formed therein, the cover being configured to constantly close the second outlet.

5. The air-conditioning vent structure of claim 4, wherein the actuator is configured to move the sliding door to adjust the opening widths of the first outlet and the second outlet of the at least one duct portion.

6. The air-conditioning vent structure of claim 2,
wherein the use mode includes an upward discharge mode, and
wherein the controller is configured to perform, in the upward discharge mode, the control operation of the actuator to move the sliding door so that the first outlet is fully opened through the second sub hole and the second outlet is completely closed.

7. The air-conditioning vent structure of claim 2,
wherein the use mode includes a mixed mode, and
wherein the controller is configured to perform, in the mixed mode, the control operation of the actuator to move the sliding door so that the opening width of the first outlet is adjusted by the first sub hole or the second sub hole and the opening width of the second outlet is adjusted by the second sub hole.

8. The air-conditioning vent structure of claim 2,
wherein the use mode includes a mixed mode, and
wherein the controller is configured to perform, in the mixed mode, the control operation of the actuator to move the sliding door so that the opening width of the first outlet opened through the second sub hole is smaller than the opening width of the second outlet opened through the second sub hole.

9. The air-conditioning vent structure of claim 2,
wherein the use mode includes a mixed mode, and
wherein the controller is configured to perform, in the mixed mode, the control operation of the actuator to move the sliding door so that the opening width of the first outlet opened through the first sub hole is smaller than the opening width of the second outlet opened through the second sub hole.

10. The air-conditioning vent structure of claim 2,
wherein the use mode includes heating and cooling modes, and
wherein the controller is configured to perform, in the heating and cooling modes, the control operation of the actuator to move the sliding door so that the first outlet is completely closed and the second outlet is completely opened through the second sub hole.

11. The air-conditioning vent structure of claim 2,
wherein the use mode includes a closed mode, and
wherein the controller is configured to perform, in the closed mode, the control operation of the actuator to move the sliding door so that the first outlet and the second outlet are completely closed.

12. The air-conditioning vent structure of claim 2,
wherein the use mode includes a mixed mode, and
wherein the second sub hole is formed to correspond to maximum opening widths of the first outlet and the second outlet in the mixed mode.

13. The air-conditioning vent structure of claim 2,
wherein a separation distance between the first sub hole and the second sub hole is defined such that the sliding door completely closes the first outlet in a heating and cooling mode, and
wherein the first sub hole is positioned such that, in a mixed mode state, an opening width of the first outlet through the first sub hole is greater than an opening width of the second outlet through the second sub hole.

14. The air-conditioning vent structure of claim 2,
wherein the use mode includes a mixed mode, and
wherein the first sub hole is formed so that the opening width of the first outlet opened through the first sub hole is greater than the opening width of the second outlet opened through the second sub hole when the sliding door is moved to enter the mixed mode.

15. The air-conditioning vent structure of claim 1, further including a sliding door guide formed on one surface of the at least one duct portion and configured to guide the sliding door.

16. The air-conditioning vent structure of claim 1, wherein air discharged from the second outlet is guided along a curvature surface formed in the second outlet.

* * * * *